United States Patent
Choi et al.

(10) Patent No.: US 9,848,352 B2
(45) Date of Patent: Dec. 19, 2017

(54) APPARATUS AND METHOD FOR SAVING POWER CONSUMPTION IN BROADBAND WIRELESS COMMUNICATION SYSTEM

(71) Applicant: Samsung Electronics Co., Ltd., Gyeonggi-do (KR)

(72) Inventors: Yun-Seok Choi, Hwaseong-si (KR); Seung-Joo Maeng, Seongnam-si (KR); Byung Chan Ahn, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/546,623

(22) Filed: Nov. 18, 2014

(65) Prior Publication Data

US 2015/0071379 A1     Mar. 12, 2015

Related U.S. Application Data

(63) Continuation of application No. 13/085,993, filed on Apr. 13, 2011, now Pat. No. 8,891,649.

(30) Foreign Application Priority Data

Apr. 13, 2010 (KR) ........................ 10-2010-0033669

(51) Int. Cl.
*H04W 28/02* (2009.01)
*H04W 52/02* (2009.01)
(Continued)

(52) U.S. Cl.
CPC ...... *H04W 28/0221* (2013.01); *H04B 7/0413* (2013.01); *H04B 7/0615* (2013.01);
(Continued)

(58) Field of Classification Search
CPC ... H04L 5/001; H04L 5/0094; H04L 41/0893; H04L 5/0058; H04L 5/0098; H04L 27/0008; H04L 47/2433
(Continued)

(56) References Cited

U.S. PATENT DOCUMENTS

| | | | |
|---|---|---|---|
| 6,744,743 B2 * | 6/2004 | Walton et al. | 370/318 |
| 2006/0251156 A1 | 11/2006 | Grant et al. | |

(Continued)

FOREIGN PATENT DOCUMENTS

| | | |
|---|---|---|
| KR | 10-2001-0039191 A | 5/2001 |
| KR | 2009-0031433 | 3/2009 |

OTHER PUBLICATIONS

Notice of Patent Grant dated Dec. 14, 2015 in connection with Korean Patent Application No. 10-2010-0033669; 7 pages.
Notice of Preliminary Rejection dated Jun. 13, 2016 in connection with Korean Patent Application No. 10-2010-0030429; 9 pages.
Luciano Bononi, et al., "A Distributed Contention Control Mechanism for Power Saving in Random-Access Ad-Hoc Wireless Local Area Networks", IEEE, 1999, pp. 114-123.
(Continued)

*Primary Examiner* — Kabir A Timory

(57) ABSTRACT

An apparatus and method reduce power consumption in a broadband wireless communication system. A transmitting end apparatus that includes a plurality of transmit (Tx) antennas includes a control block, a Processor (DSP) block, a modem block, and at least one power controller. The control block determines a traffic amount based on an amount of used resources. The Digital Signal Processor (DSP) block performs scheduling by using a subset of Tx antennas and a subset of resources on a frequency axis if the traffic amount is less than a threshold. The modem block applies boosting to a signal transmitted using the subset of resources. And at least one controller turns off an operation of at least one power amplifier that corresponds to at least one Tx antenna that is not included in the subset of Tx antennas.

19 Claims, 5 Drawing Sheets

(51) Int. Cl.
- *H04W 52/42* (2009.01)
- *H04W 52/52* (2009.01)
- *H04B 7/0413* (2017.01)
- *H04B 7/06* (2006.01)
- *H04W 72/04* (2009.01)
- *H04W 72/12* (2009.01)

(52) U.S. Cl.
CPC ....... *H04W 52/0274* (2013.01); *H04W 52/42* (2013.01); *H04W 52/52* (2013.01); *H04W 72/0446* (2013.01); *H04W 72/1252* (2013.01); *Y02B 60/50* (2013.01)

(58) Field of Classification Search
USPC ....... 375/295, 267, 260, 219, 297, 299, 345, 375/347, 349
See application file for complete search history.

(56) References Cited

U.S. PATENT DOCUMENTS

| | | |
|---|---|---|
| 2008/0095263 A1 | 4/2008 | Xu et al. |
| 2008/0207143 A1* | 8/2008 | Skarby et al. ............... 455/103 |
| 2009/0052426 A1 | 2/2009 | Perraud |
| 2012/0063377 A1 | 3/2012 | Osterling et al. |

OTHER PUBLICATIONS

Korean Intellectual Patent Office, "Notice of Final Rejection," Application No. 10-2016-0030429, dated Feb. 2, 2017, 6 pages, publisher KIPO, Daejeon, Republic of Korea.

Korean Intellectual Patent Office, "Notice of Final Rejection," Application No. 10-2016-0030429, dated Dec. 19, 2016, 6 pages, publisher KIPO, Daejeon, Republic of Korea.

* cited by examiner

Tx ANTENNA #0

Tx ANTENNA #1

APPARATUS AND METHOD FOR SAVING POWER CONSUMPTION IN BROADBAND WIRELESS COMMUNICATION SYSTEM

CROSS-REFERENCE TO RELATED APPLICATION(S) AND CLAIM OF PRIORITY

The present application is a continuation of prior U.S. patent application Ser. No. 13/085,993, filed on Apr. 13, 2011, which is related to and claims the benefit of priority under 35 U.S.C. §119(a) to a Korean patent application filed in the Korean Intellectual Property Office on Apr. 13, 2010 and assigned Serial No. 10-2010-0033669. The disclosure of both of these documents is hereby incorporated by reference.

TECHNICAL FIELD OF THE INVENTION

The present invention relates to a broadband wireless communication system. More particularly, the present invention relates to an apparatus and method for saving power consumption in the broadband wireless communication system.

BACKGROUND OF THE INVENTION

In the next generation communication system, also known as the 4th Generation (4G) communication system, research efforts are actively in progress to provide users with various services with a Quality of Service (QoS) at a data transfer rate of about 100 megabit per second (Mbps). A representative example of such a communication system is an Institute of Electrical and Electronics Engineers (IEEE) 802.16 system. The IEEE 802.16 system applies an Orthogonal Frequency Division Multiplexing (OFDM)/Orthogonal Frequency Division Multiple Access (OFDMA) scheme to a physical channel to support a broadband network.

In the OFDM/OFDMA-based communication system, a Multiple Input Multiple Output (MIMO) scheme that uses multiple Transmit (Tx) antennas can be applied to improve system reliability or to support a higher data transfer rate. To improve the system reliability, a Space-Time Coding (STC) scheme can be used, and a spatial diversity gain is increased. To improve the data transfer rate, a Spatial Multiplexing (SM) scheme can be used. According to the two methods above, all transmitting ends transmit a plurality of separate streams through separate Tx antennas during the same time period.

FIG. 1 illustrates an example of a Tx frame for each antenna based on a MIMO scheme in a broadband wireless communication system. Two Tx antennas are used in a Tx frame structure of FIG. 1. A downlink subframe is divided into a preamble area 110 that includes one symbol length, a map area 120 in which burst allocation information is carried, and a data burst allocation area 130. An antenna Cyclic Delay Diversity (CDD) scheme is applied to signals transmitted through the respective antennas in the preamble area 110 and the map area 120. The CDD scheme provides a cyclic delay which differs from one antenna to another when one stream is transmitted through a plurality of Tx antennas. A diversity gain is obtained when using the CDD scheme. A signal transmitted using the data burst area 130 includes different data streams in an antenna #0 and an antenna #1. In addition, although not shown, when using four Tx antennas, Tx frames illustrated in FIG. 1 are used for each antenna pair. That is, the four Tx frames are transmitted through the respective antennas. In this situation, the CDD scheme can be used in each antenna pair.

Because the aforementioned MIMO scheme is used to increase a data transfer rate, it is very effective when a traffic amount is great. However, when the traffic amount is small, the MIMO scheme based on multiple antenna transmission may be inefficient. This is because unnecessary power consumption may be caused when signals are transmitted through a plurality of Tx antennas in a situation where a higher data rate is not required in transmission. That is, although a required data rate can be achieved even if the signals are transmitted by using one Tx antenna, the use of a plurality of Tx antennas results in the increase of power consumption caused by an overlapping preamble, MAP, and such, as illustrated in FIG. 1. In this situation, the power consumption increases in proportion to the number of Tx antennas in use. Therefore, when using the MIMO scheme, there is a need for a method for avoiding unnecessary power consumption when a traffic amount decreases.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and method for avoiding unnecessary power consumption caused by a decrease in a traffic amount when a Multiple Input Multiple Output (MIMO) scheme is used in a broadband wireless communication system.

Another aspect of the present invention is to provide an apparatus and method for controller the on/off state of a power amplifier according to a traffic amount in a broadband wireless communication system.

Another aspect of the present invention is to provide an apparatus and method for maintaining coverage by using a subset of transmission antennas in a broadband wireless communication system.

According to an aspect of the present invention, a transmitting end apparatus that includes a plurality of transmit (Tx) antennas in a broadband wireless communication system is provided. The apparatus includes a control block for determining a traffic amount based on an amount of used resources. A Digital Signal Processor (DSP) block performs scheduling by using a subset of Tx antennas and a subset of resources on a frequency axis if the traffic amount is less than a threshold. A modem block applies boosting to a signal transmitted using the subset of resources. And at least one controller turns off an operation of at least one power amplifier that corresponds to at least one Tx antenna that is not included in the subset of Tx antennas.

According to another aspect of the present invention, a method of operating a transmitting end that includes a plurality of Tx antennas in a broadband wireless communication system is provided. A traffic amount is determined based on an amount of used resources. Scheduling is performed by using a subset of Tx antennas and a subset of resources on a frequency axis if the traffic amount is less than a threshold. Boosting is applied to a signal transmitted using the subset of resources. And an operation of at least one power amplifier that corresponds to at least one Tx antenna that is not included in the subset of Tx antennas is turned off.

According to another aspect of the present invention, a method of operating a transmitting end that includes a plurality of Tx antennas in a broadband wireless communication system is provided. The method includes determining whether a traffic amount is less than a threshold. When the traffic amount is less than the threshold, a subset of Tx antennas and a subset of frequencies resources for transmitting signals are selected. A power amplifier for at least one Tx antenna that is not included in the selected subset of Tx antennas is turned off. And boosting is applied to a signal transmitted through the selected subset of resources.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 2 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system The present disclosure describes a technique for avoiding unnecessary power consumption caused by a decrease in a traffic amount when a Multiple Input Multiple Output (MIMO) scheme is used in a broadband wireless communication system. Although a wireless communication system based on Orthogonal Frequency Division Multiplexing (OFDM)/Orthogonal Frequency Division Multiple Access (OFDMA) will be described hereinafter, for example, the present invention is also applicable to other types of wireless communication systems.

In brief, a system according to an embodiment of the present invention determines a traffic amount on a real time basis, and performs an operation for saving power consumption based on the traffic amount. If it is determined that the traffic amount is greater than or equal to a specific level, the system transmits data according to the MIMO scheme. Otherwise, if it is determined that the traffic amount is less than the specific level, the system turns off power amplifier modules connected to a subset of antennas and changes a scheduling mode to a packet allocation mode.

Figure 1:
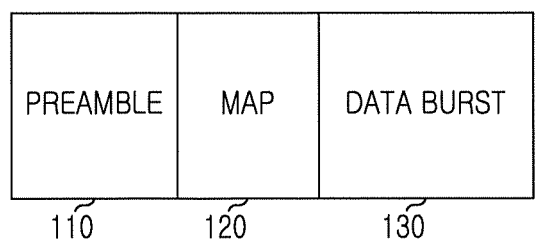
FIG. 1 illustrates an example of a Transmit (Tx) frame for each antenna on the basis of a Multiple Input Multiple Output (MIMO) scheme in a broadband wireless communication system.
Figure 1:
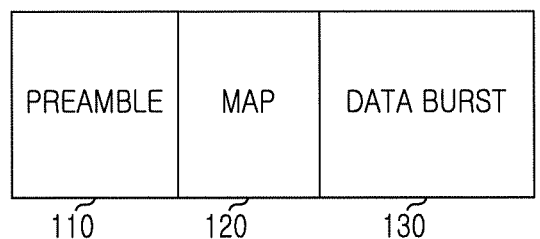

To effectively save power consumption, the present invention defines a MIMO+ mode and a Single Input Multiple Output (SIMO)+ mode in addition to the MIMO mode of FIG. 1. The MIMO+ mode and the SIMO+ mode are modes in which at least one power amplifier module connected to an antenna is turned off. When in the MIMO+ mode, signals are transmitted to a plurality of Transmit (Tx) antennas by using a subset of resources on a frequency axis of a downlink subframe, and when in the SIMO+ mode, signals are transmitted to one Tx antenna by using a subset of resources on the frequency axis of the downlink subframe. For example, a Tx frame based on the MIMO+ mode is illustrated in FIG. 2, and a Tx frame based on the SIMO+ mode is illustrated in FIG. 3.

Figure 2:
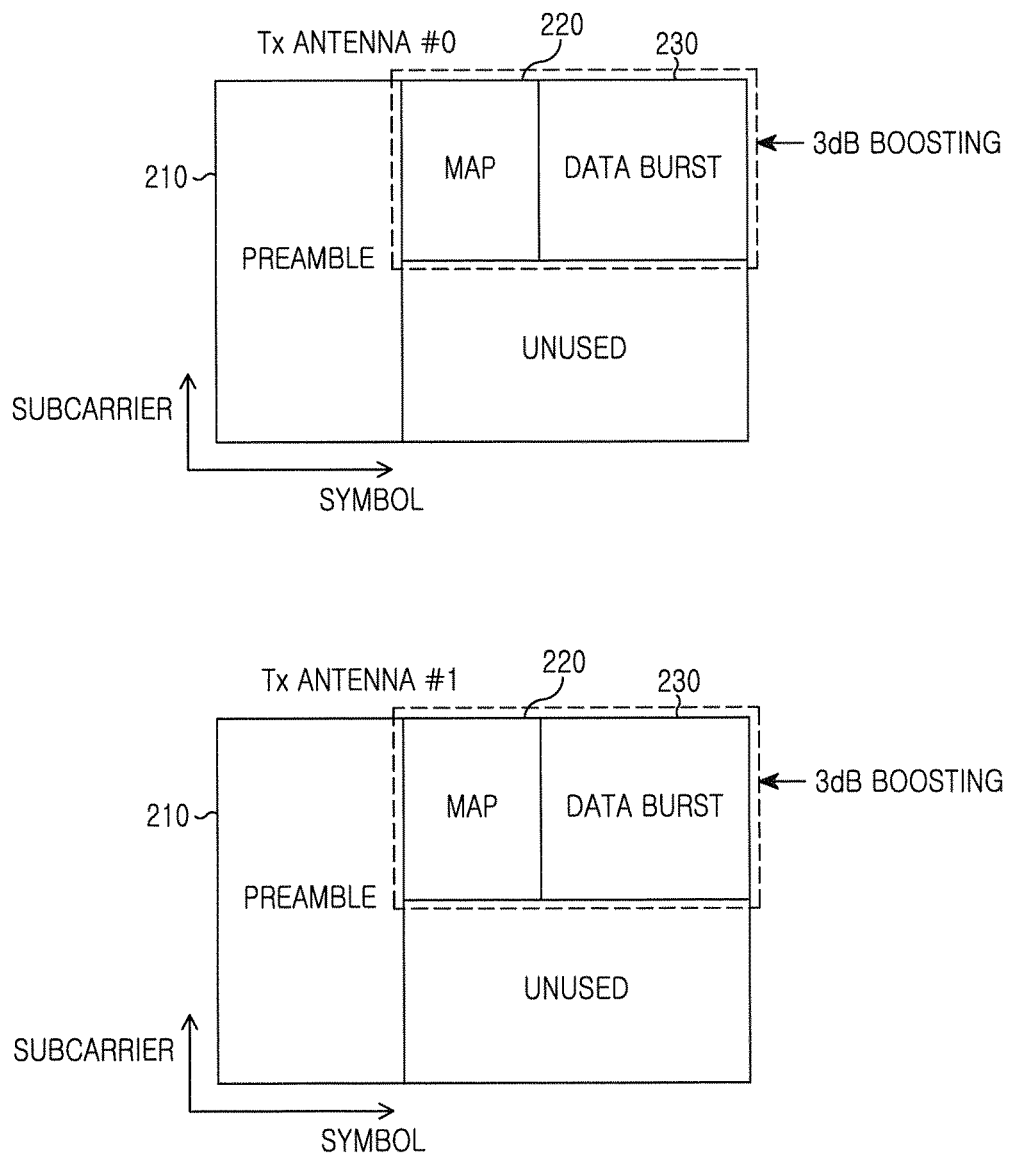
FIG. 2 illustrates a Tx frame based on a MIMO+ mode in a broadband wireless communication system according to an embodiment of the present invention.
Figure 3:
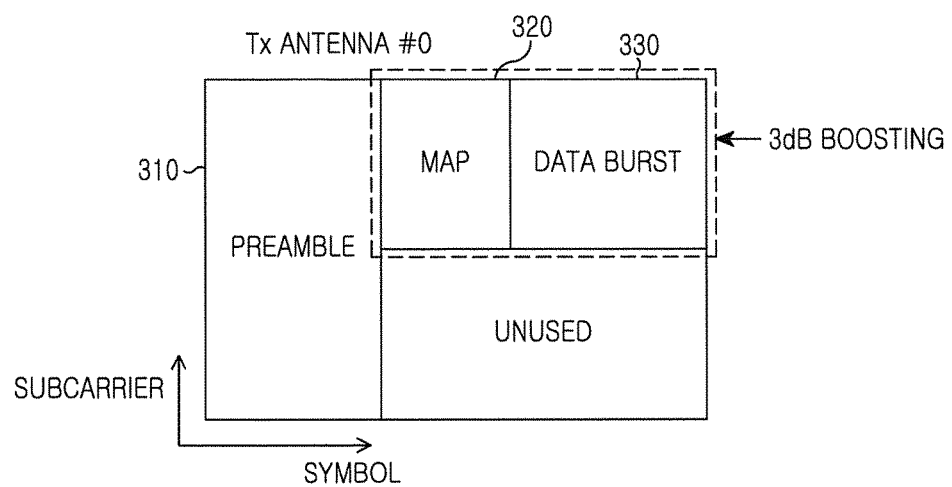
FIG. 3 illustrates a Tx frame based on a Single Input Multiple Output (SIMO)+ mode in a broadband wireless communication system according to an embodiment of the present invention.

FIG. 2 illustrates a Tx frame based on a MIMO+ mode in a broadband wireless communication system according to an embodiment of the present invention. When the MIMO+ mode is applied to a transmitting end that uses four Tx antennas, the transmitting end performs communication by using two of the four Tx antennas. In general, the transmitting end requires Tx power greater than or equal to a specific level (e.g. threshold) in order to deliver a signal to a coverage boundary. Because the Tx power is distributed to each antenna, when using two out of the four Tx antennas, a coverage hole may be produced. That is, because Tx power is halved by the use of only two out of the four Tx antennas, the signal may not be detected at the coverage boundary.

To prevent the coverage hole from being produced, the transmitting end transmits a signal by using a subset of resources on the frequency axis. For example, the subset of resources may be half of all subcarriers. In doing so, the transmitting end can boost Tx power allocated to the two antennas. Accordingly, by using two out of the four Tx antennas, the transmitting end can maintain the same coverage as when the four Tx antennas are used.

As illustrated in FIG. 2 above, when in the MIMO+ mode, a signal transmitted through each Tx antenna includes a preamble 210, a map 220, and a data burst 230. In an embodiment, the preamble 210 has to transmit all predefined sequences and, thus, is transmitted across a full band. However, the map 220 and the data burst 230 use a subset of all subcarriers, and 3 dB boosting is applied to the subset of all subcarriers.

FIG. 3 illustrates a Tx frame based on an SIMO+ mode in a broadband wireless communication system according to an embodiment of the present invention. The SIMO+ mode is used when a transmitting end that uses two Tx antennas performs communication by using one of the two Tx antennas. In general, the transmitting end requires Tx power greater than or equal to a specific level in order to deliver a signal to a coverage boundary. Because the Tx power is distributed to each antenna, when using one of the two Tx antennas, a coverage hole may be produced. In other words, because Tx power is halved by the use of one Tx antenna, the signal may not be detected at the coverage boundary.

To prevent the coverage hole from being produced, the transmitting end transmits a signal by using a subset of resources on the frequency axis. For example, the subset of resources may be half of all subcarriers. In doing so, the transmitting end can boost Tx power allocated to one antenna. Accordingly, by using one of two Tx antennas, the transmitting end can maintain the same coverage as when two Tx antennas are used.

As illustrated in FIG. 3 above, when in the SIMO+ mode, a signal transmitted through each Tx antenna includes a preamble 310, a map 320, and a data burst 330. In an embodiment, the preamble 310 has to transmit all predefined sequences and thus is transmitted across a full band. However, the map 320 and the data burst 330 use a subset of all subcarriers, and 3 dB boosting is applied to the subset of all subcarriers.

Figure 4:
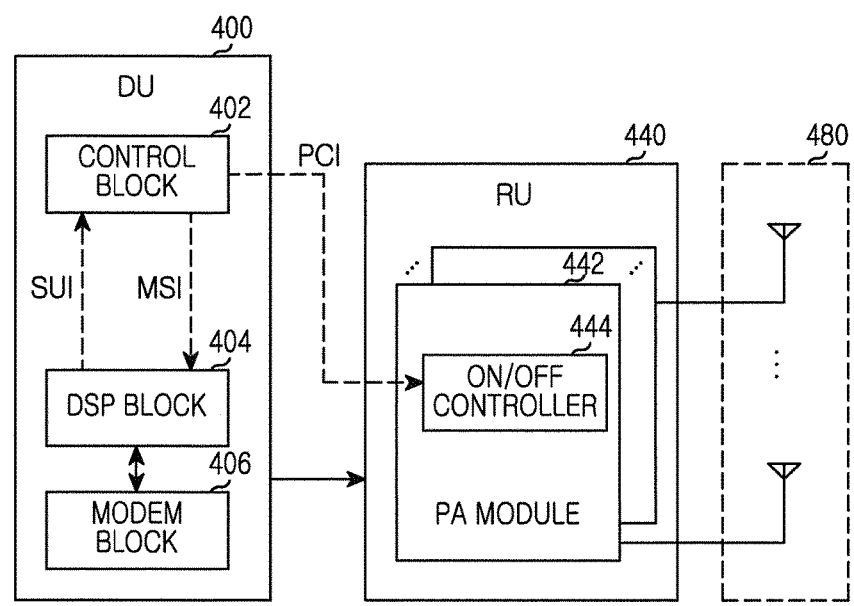
FIG. 4 is a block diagram of a transmitting end in a broadband wireless communication system according to an embodiment of the present invention.

FIG. 4 is a block diagram of a transmitting end in a broadband wireless communication system according to an embodiment of the present invention.

Referring to FIG. 4, the transmitting end includes a Digital Unit (DU) 400, a Radio Unit (RU) 440, and a plurality of antennas 480. The DU 400 processes a digital signal and includes a control block 402, a Digital Signal Processor (DSP) block 404, and a modem block 406. The RU 440 processes a Radio Frequency (RF) signal and includes a plurality of Power Amplifier (PA) modules 442, and a plurality of on/off controllers 444.

The control block 402 controls functions of blocks included in the DU 400. In particular, according to the embodiment of the present invention, the control block 402 receives information regarding an amount of used resources from the DSP block 404, and determines a traffic amount by using the information regarding the amount of used resources. That is, the control block 402 receives Slot Utilization Information (SUI) from the DSP block 404. The SUI is generated in every frame and represents a ratio of the number of actually allocated slots to the total number of slots that can be allocated. In an embodiment, the control block 402 determines a long-term averaged slot utilization rate by using the SUI. For example, the long-term averaged slot utilization rate may be determined according to equation 1, below.

$$Su(n)=\alpha \times Su(n-1)+(1-\alpha)\times SUI(n) \qquad [\text{Eqn. 1}]$$

In Equation 1, Su(n) denotes an $n^{th}$ determined long-term averaged slot utilization rate, $\alpha$ denotes a forgotten factor, and SUI(n) denotes an $n^{th}$ provided SUI. Herein, the forgotten factor a is a real number that is greater than 0 and is less than 1.

According to the traffic amount, the control block 402 controls the on/state off of the PA module and also controls a mode change. That is, the control block 402 delivers a Power Control Indicator (PCI) to the on/off controller 444 to turn on/off the PA module, and delivers a Mode Switch Indicator (MSI) to the DSP block 404 to control the mode change. That is, the control block 402 controls the DSP block 404 and the on/off controller 444 such that they operate in the MIMO mode when the long-term averaged slot utilization rate is greater than or equal to a threshold, or such that they operate in the MIMO+ mode or the SIMO+ mode when the long-term averaged slot utilization rate is less than the threshold.

The DSP block 404 performs scheduling on Tx packets. Furthermore, the DSP block 404 generates SUI according to a scheduling result, and provides the SUI to the control block 402. Furthermore, the DSP block 404 performs scheduling by considering an operation mode indicated by the control block 402. In an embodiment, the operation mode includes the MIMO mode, the MIMO+ mode, and the SIMO+ mode. That is, the DSP block 404 performs scheduling according to the operation mode indicated by MSI received from the control block 402. For example, in the MIMO+ mode, the DSP block 404 distributes streams to a plurality of Tx antennas and performs scheduling by using a subset of resources on a frequency axis of a frame. In the SIMO+ mode, the DSP block 404 allocates streams to one Tx antenna, and performs scheduling by using a subset of resources on the frequency axis of the frame.

The modem block 406 performs modulation and channel coding on data to be transmitted according to the scheduling result of the DSP block 404. Furthermore, the modem block 406 maps complex symbols to resources according to the scheduling result of the DSP block 404, and generates OFDMA symbols by performing an Inverse Fast Fourier Transform (IFFT) operation and Cyclic Prefix (CP) insertion. In an embodiment, when applying the MIMO+ mode or the SIMO+ mode, the modem block 406 applies 3 dB boosting.

The plurality of PA modules 442 amplify Tx signals and transmit the amplified signals through the plurality of Tx antennas 480. The plurality of PA modules 442 are coupled to the number of the plurality of Tx antennas 480, and respectively correspond to the plurality of Tx antennas 480. The plurality of on/off controller 444 turn on/off the respective operations of the plurality of PA blocks 442 under the control of the control block 402. That is, each of the plurality of on/off controller 444 turns on/off an operation of a corresponding PA block 442 according to a PCI value received from the control block 402.

According to an embodiment of the present invention, a subset of Tx antennas may be selected as follows. A receiving end estimates Signal to Interference-plus-Noise power Ratios (SINRs) for each antenna of the transmitting end, and feeds back the SINRs to the transmitting end. The control block 402 selects the subset of Tx antennas to be used to transmit signals based on the SINRs for each Tx antenna fed back from the receiving end. In an embodiment, the control block 402 selects at least one antenna that corresponds to the greatest SINR to be included in the subset of antennas. According to an embodiment, the SINR may be an average of SINRs estimated over a long period.

Figure 5:
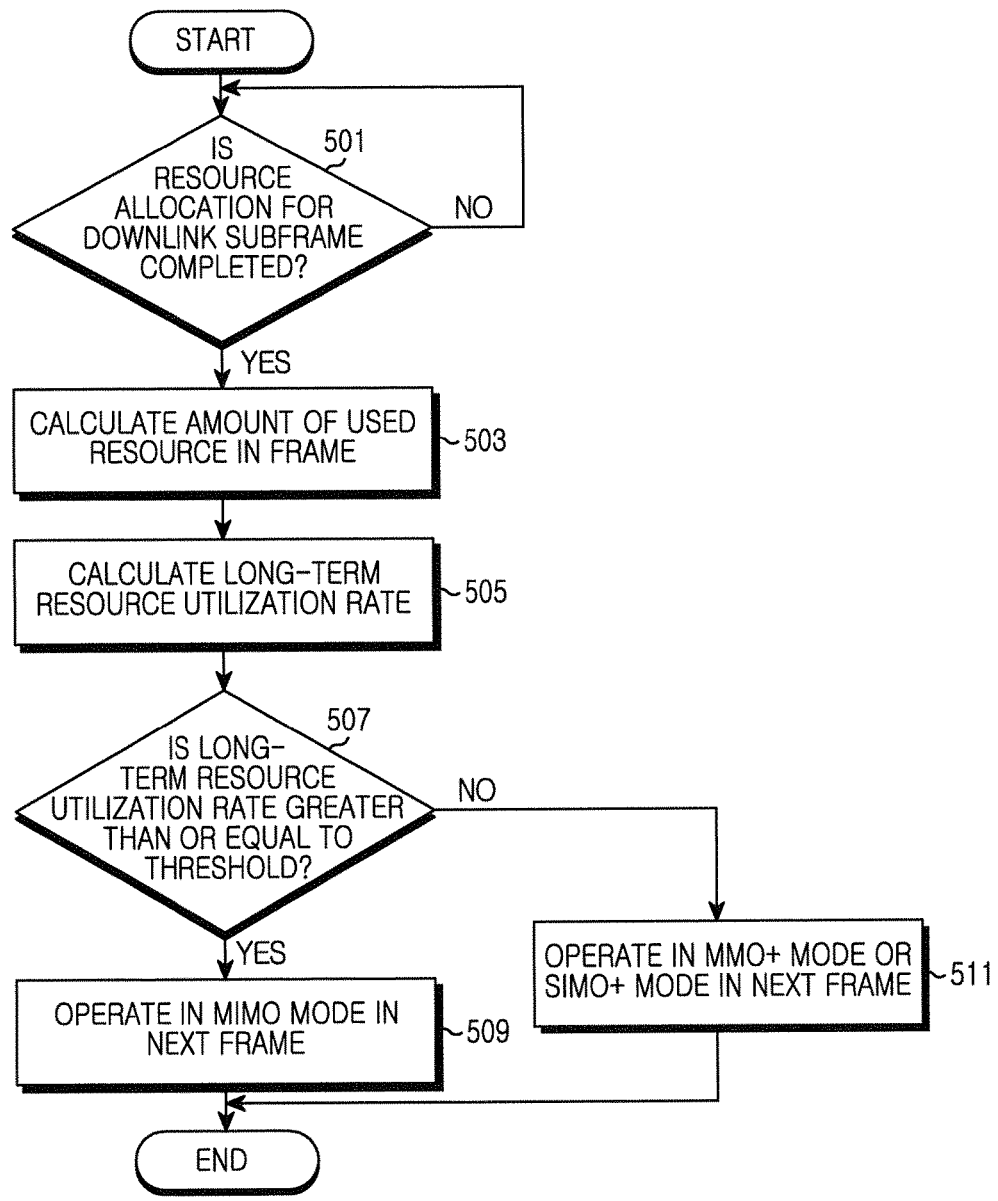
FIG. 5 illustrates a process of operating a transmitting end in a broadband wireless communication system according to an embodiment of the present invention.

FIG. 5 illustrates a process of operating a transmitting end in a broadband wireless communication system according to an embodiment of the present invention.

Referring to FIG. 5, the transmitting end determines whether resource allocation for a downlink subframe is completed in block 501. In an embodiment, a range of resources used for the resource allocation is determined according to a current operation mode. That is, when operating in the MIMO mode, resources of a full frequency band, i.e., all subcarriers, are targets to be allocated, and when operating in the MIMO+ mode or the SIMO+ mode, a subset of resources on the frequency axis are targets to be allocated. For example, the subset of resources on the frequency band may be half of all subcarriers.

Upon completion of the resource allocation for the downlink subframe, proceeding to block 503, the transmitting end calculates an amount of used resources in a frame. That is, the transmitting end calculates a ratio of the number of actually allocated slots to the total number of slots that can be allocated. Herein, the total number of slots that can be allocated is determined according to the current operation mode. The amount of used resources in the frame may be expressed by a specific parameter to be delivered to a block for determining the traffic amount in the transmitting end, and the specific parameter may be referred to as SUI.

In block 505, the transmitting end calculates a long-term resource utilization rate by using the amount of used resources in the frame. The long-term resource utilization rate is an average amount of used resources in respective frames. For example, the long-term resource utilization rate may be determined according to Equation 1.

After calculating the long-term resource utilization rate, proceeding to block 507, the transmitting end determines whether the long-term resource utilization rate is greater than or equal to a threshold. That is, the transmitting end determines a magnitude of a traffic amount by using the long-term resource utilization rate. A comparison result between the long-term resource utilization rate and the threshold may be expressed by a specific parameter to be delivered to a block for performing scheduling in the transmitting end, and the specific parameter may be referred to as an MSI.

If the long-term resource utilization rate is greater than or equal to the threshold, proceeding to block 509, the transmitting end operates in the MIMO mode in the next frame. That is, the transmitting end uses all Tx antennas and performs downlink communication according to the MIMO scheme.

In contrast, if the long-term resource utilization rate is less than the threshold, proceeding to block 511, the transmitting end operates in the MIMO+ mode or the SIMO+ mode in the next frame. That is, the transmitting end performs downlink communication by using a subset of Tx antennas among all Tx antennas. In an embodiment, the transmitting end uses a subset of resources on a frequency axis, and applies 3 dB boosting to a Tx signal. In an embodiment, the subset of resources may correspond to the subset of Tx antennas. However, the transmitting end transmits a preamble across a full band, and does not apply the 3 dB boosting. For example, in the MIMO+ mode, the transmitting end configures a Tx frame as illustrated in FIG. 2, and in the SIMO+ mode, the transmitting end configures a Tx frame as illustrated in FIG. 3. In other words, in the next frame, the transmitting end performs scheduling by using a subset of Tx antennas and a subset of resources on the frequency axis in a downlink subframe, applies boosting to a signal transmitted through the subset of resources, and turns off an operation of at least one power amplifier that corresponds to at least one remaining Tx antenna that is not included in the subset of Tx antennas.

According to an embodiment of the present invention, the subset of Tx antennas may be selected as follows. A receiving end estimates SINRs for each antenna of the transmitting end, and feeds back the SINRs to the transmitting end. The transmitting end selects the subset of Tx antennas to be used to transmit signals based on the SINRs for each Tx antenna fed back from the receiving end. In an embodiment, the transmitting end selects at least one antenna corresponding to greatest SINR to be included in the subset of antennas. In an embodiment, the SINR may be an average of SINRs estimated over a long period.

According to embodiments of the present invention, operations of a subset of power amplifiers are turned on/off based on a traffic amount in a transmitting end that uses a plurality of Tx antennas, and thus power consumption and costs can be effectively saved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus in a wireless communication system, the apparatus comprising:
    a controller;
    at least one transceiver operatively coupled to the controller,
    wherein the controller is configured to:
        determine whether a traffic amount associated with the apparatus is greater than or equal to a threshold, the traffic amount determined during a predetermined period;
        transmit, based on a determination that the traffic amount is greater than or equal to the threshold, a first signal on a plurality of subcarriers using a plurality of antennas with a first transmit power for each antenna; and
        transmit, based on a determination that the traffic amount is less than the threshold, a second signal on a subset of the plurality of subcarriers using a subset of the plurality of antennas with a second transmit power for each antenna, and
    wherein the second transmit power is greater than the first transmit power.

2. The apparatus of claim 1, wherein the controller is further configured to determine the traffic amount based on a ratio of allocated slots to total available slots during the predetermined period.

3. The apparatus of claim 1, wherein the controller is further configured to determine the traffic amount by calculating an average amount of used resources.

4. The apparatus of claim 1, wherein the controller is further configured to indicate whether the traffic amount is less than the threshold to at least one processor performing a scheduling, and, to indicate whether a power amplifier is disabled to the at least one transceiver.

5. The apparatus of claim 1, wherein the second transmit power is greater than the first transmit power by 3dB.

6. The apparatus of claim 1, wherein the second transmit power is determined by applying a power boosting to the first transmit power.

7. The apparatus of claim 1, wherein the controller is further configured to determine the subset of the plurality of antennas among the plurality of antennas based on a channel quality for each of the plurality of antennas.

8. The apparatus of claim 1, wherein the controller is further configured to disable at least one power amplifier that corresponds to at least one antenna of remaining antennas except the subset of the plurality of antennas among the plurality of antennas.

9. A method for operating an apparatus in a wireless communication system, the method comprising:
- determining whether a traffic amount associated with the apparatus is greater than or equal to a threshold, the traffic amount determined during a predetermined period; and
- transmitting, based on a determination that the traffic amount is greater than or equal to the threshold, a first signal on a plurality of subcarriers using a plurality of antennas with a first transmit power for each antenna; and
- transmitting, based on a determination that the traffic amount is less than the threshold, a second signal on a subset of the plurality of subcarriers using a subset of the plurality of antennas with a second transmit power for each antenna, and
- wherein the second transmit power is greater than the first transmit power.

10. The method of claim 9, wherein determining the traffic amount comprises determining the traffic amount based on a ratio of allocated slots to total available slots during the predetermined period.

11. The method of claim 9, wherein determining the traffic amount further comprises determining the traffic amount by calculating an average amount of used resources.

12. The method of claim 9, wherein controlling the second transmit power is greater than the first transmit power by 3dB.

13. The method of claim 9, wherein the second transmit power is determined by applying a power boosting to the first transmit power.

14. The method of claim 9, further comprising:
- determining the subset of the plurality of antennas among the plurality of antennas based on a channel quality for each of the plurality of antennas.

15. The method of claim 9, further comprising:
- disabling at least one power amplifier that corresponds to at least one antenna of remaining antennas except the subset of the plurality of antennas among the plurality of antennas.

16. The apparatus of claim 1, wherein at least one of the subset of the plurality of the antennas comprises an antenna responding a greatest signal to Interference-plus-noise power ratio (SINR) among the plurality of the antennas.

17. The apparatus of claim 16, wherein the SINR is an average of SINRs estimated over long period.

18. The method of claim 9, wherein at least one of the subset of the plurality of the antennas comprises an antenna responding a greatest signal to Interference-plus-noise power ratio (SINR) among the plurality of the antennas.

19. The method of claim 18, wherein the SINR is an average of SINRs estimated over a long period.

* * * * *